United States Patent [19]
Huffmaster et al.

[11] Patent Number: 5,437,253
[45] Date of Patent: Aug. 1, 1995

[54] SYSTEM AND METHOD FOR CONTROLLING THE TRANSIENT TORQUE OUTPUT OF A VARIABLE DISPLACEMENT INTERNAL COMBUSTION ENGINE

[75] Inventors: Roger L. Huffmaster, Canton; Jerry D. Robichaux, Southgate, both of Mich.

[73] Assignee: Ford Motor Company, Dearborn, Mich.

[21] Appl. No.: 298,694

[22] Filed: Aug. 31, 1994

Related U.S. Application Data

[62] Division of Ser. No. 172,361, Dec. 23, 1993, Pat. No. 5,374,224.

[51] Int. Cl.$^6$ .................... F02D 11/10; F02D 43/04; F02D 17/02; F02P 5/15
[52] U.S. Cl. .................... 123/399; 123/419; 123/481
[58] Field of Search .............. 123/396, 399, 361, 403, 123/416, 417, 419, 422, 423, 436, 478, 481, 198 F

[56] References Cited

U.S. PATENT DOCUMENTS

| | | | |
|---|---|---|---|
| 4,144,863 | 3/1979 | Abdoo | 123/198 F |
| 4,172,434 | 10/1979 | Coles | 123/481 |
| 4,224,920 | 9/1980 | Sugasawa et al. | 123/198 F |
| 4,509,488 | 4/1985 | Forster et al. | 123/481 |
| 4,541,387 | 9/1985 | Morikawa | 123/481 |
| 4,550,704 | 11/1985 | Barho et al. | 123/481 |
| 5,042,444 | 8/1991 | Hayes et al. | 123/481 |
| 5,099,816 | 3/1992 | Ohga et al. | 123/481 |
| 5,113,823 | 5/1992 | Iriyama | 123/399 |
| 5,119,781 | 6/1992 | Trombley et al. | 123/481 |
| 5,213,081 | 5/1993 | Fujimoto | 123/419 |
| 5,283,742 | 2/1994 | Wazaki et al. | 123/481 |
| 5,287,279 | 2/1994 | Anan | 123/481 |
| 5,365,441 | 11/1994 | Ander et al. | 123/481 |

*Primary Examiner*—Willis R. Wolfe
*Attorney, Agent, or Firm*—Jerome R. Drouilliard; Roger L. May

[57] ABSTRACT

A system for controlling the transient torque output of a multicylinder, variable displacement, spark-ignited, fuel injected automotive internal combustion engine during periods when the effective displacement of the engine is being changed includes a spark timing controller, a throttle controller for positioning an intake air throttle, an engine cylinder operator for deactivating and reactivating at least some of the engine's cylinders, and an engine controller having a processor for selecting the number of cylinders for operation and for operating the spark timing controller, the throttle controller, and the cylinder operator so that during any transition from operation with a first number of activated cylinders to operation with a second number of activated cylinders, the processor will alter the spark advance and control the amount of air entering the engine cylinders so that the torque output of the engine will remain relatively unchanged during the transition.

15 Claims, 3 Drawing Sheets

SYSTEM AND METHOD FOR CONTROLLING THE TRANSIENT TORQUE OUTPUT OF A VARIABLE DISPLACEMENT INTERNAL COMBUSTION ENGINE

This is a divisional of application Ser. No. 08/172,361 filed Dec. 23, 1993, now U.S. Pat. No. 5,374,224.

BACKGROUND OF THE INVENTION

This invention relates to a system for controlling a multi-cylinder variable displacement internal combustion engine so as to avoid excessive torque excursions during transitions from one effective displacement to another.

DESCRIPTION OF THE PRIOR ART

Automotive vehicle designers and manufacturers have realized for years that it is possible to obtain increased fuel efficiency if an engine can be operated on less than the full complement of cylinders during certain running conditions. Accordingly, at low speed, low load operation, it is possible to save fuel if the engine can be run on four instead of eight cylinders or three, instead of six cylinders. In fact, one manufacturer offered a 4-6-8 variable displacement engine several years ago, and Ford Motor Company designed a 6-cylinder engine capable of operation on only three cylinders which, although never released for production, was developed to a highly refined state. Unfortunately, both of the aforementioned engines suffered from deficiencies associated with their control strategies. Specifically, customer acceptance of the engine system actually in production was unsatisfactory because the powertrain tended to "hunt" or shift frequently between the various cylinder operating modes. In other words, the engine would shift from four to eight cylinder operation frequently, while producing noticeable torque excursions. This had the undesirable effect of causing the driver to perceive excessive changes in transmission gear in the nature of downshifting or upshifting. Another drawback to prior art systems resided in the fact that the engine's torque response corresponding to a given change in the accelerator pedal position varied quite widely with the number of cylinders actually in operation. For example, when the engine was in eight-cylinder operation, a given change in the accelerator pedal position would produce a certain change in engine torque output at any particular engine speed. However, when the engine was operated at less than the total number of cylinders, e.g., 4 or 6 cylinders, for the same change in accelerator pedal position a much reduced torque response was available. As a result, the vehicles felt sluggish and non-responsive to driver input.

It is an object of the present invention to provide a system for operating the engine's air throttle, spark timing and, in the case of automatic transmission vehicles, the torque converter clutch, such that torque excursions occasioned by changes in the number of cylinders being operated, which in fact amount to changes in the effective displacement of the engine, are minimized.

SUMMARY OF THE INVENTION

A system for controlling the transient torque output of a multicylinder variable displacement internal combustion engine during changes in the effective displacement of the engine includes a spark timing controller, a throttle controller for positioning an intake air throttle, an engine cylinder operator means for deactivating and reactivating at least some of the cylinders, and an engine controller having a processor for selecting the number of cylinders for operation and for operating said spark timing controller, said throttle controller, and said cylinder operator means such that during any transition from operation with a first number of activated cylinders to operation with a second number of activated cylinders, the processor will alter the spark advance and control the amount of air entering the engine cylinders so that the torque output of the engine will remain relatively unchanged during such transition.

The processor will command the throttle to a position approximating its wide-open position whenever the engine transitions from a state of operation of a greater number of activated cylinders to a lesser number of activated cylinders. Conversely, the processor will command the throttle to a position approximating its closed position whenever the engine transitions from a state of operation of a lesser number of activated cylinders to a greater number of activated cylinders. The processor preferably commands the spark timing controller to retard the spark advance during such transitions from one effective displacement to another. The spark advance will be retarded to a point which is less than the minimum advance for best torque, with the spark being retarded by an amount proportional to the degree to which the air charge within the cylinders which had been activated prior to a transition either exceeds or is less than the air charge within the cylinders remaining activated after the transition.

During transitions from operation at a lesser number of cylinders to operation at a greater number of cylinders, the processor will maintain the throttle at its closed position for a time sufficient to allow pressure within the intake manifold to decay to the pressure at which the engine will have substantially the same torque output with the number of cylinders in operation after the transition as it had with a different number of cylinders prior to the transition. Conversely, the processor will maintain the throttle in an open position during transitions from operation at a greater number of cylinders to operation at a lesser number of cylinders for a time sufficient to allow pressure within the intake manifold to increase to the pressure at which the engine will have substantially the same torque output with the number of cylinders in operation after the transition as it had with a different number of cylinders prior to the transition.

According to another aspect of the present invention, a method for controlling the torque output of a multi-cylinder, variable displacement, spark-ignited, fuel injected, automotive internal combustion engine during changes in the effective displacement, includes the steps of commanding a cylinder operator to change the number of activated cylinders, controlling the spark advance so as to temporarily limit the torque capability of the engine until the transition to the new number of cylinders has been accomplished, and controlling the flow of air into the engine cylinders such that the amount of air admitted into the activated cylinders after the transition corresponds to the torque output of the engine prior to the transition. The spark is preferably retarded by an amount which is proportional to the degree to which the air charge exceeds the normal, or steady state, air charge for operation with the number of cylinders which are firing after the transition has been completed.

DETAILED DESCRIPTION OF THE PREFERRED EMBODIMENTS

Figure 1:
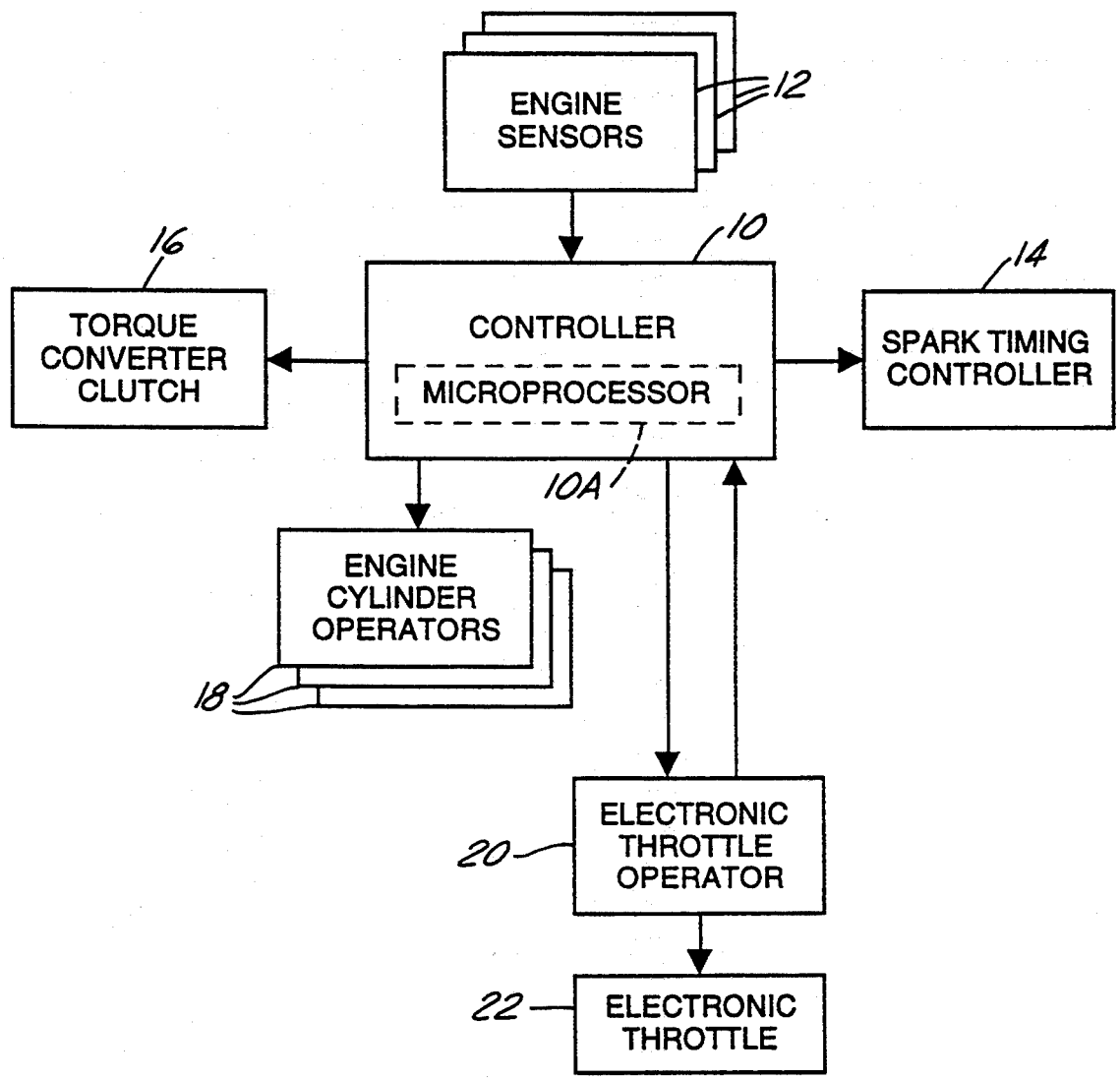
FIG. 1 is a block diagram of an transient torque output control system according to the present invention.

As shown in FIG. 1, a system for controlling the torque output of a variable displacement automotive engine according to the present invention includes microprocessor controller 10 of the type commonly used to provide engine control. Controller 10 contains microprocessor 10A, which uses a variety of inputs from various sensors, such as sensors 12, which may include engine coolant temperature, air charge temperature, engine mass airflow, intake manifold pressure, accelerator pedal position, engine speed, and other engine and vehicle sensors known to those skilled in the art and suggested by this disclosure. Controller 10 operates spark timing controller 14 and electronic throttle operator 20. In addition, through a plurality of engine cylinder operators 18, controller 10 has the capability of disabling selected cylinders in the engine so as to cause the engine to have a reduced effective displacement. For example, with an eight-cylinder engine, the engine may be operated on 4, 5, 6 or 7 cylinders, or even 3 cylinders, as required.

Those skilled in the art will appreciate in view of this disclosure that a number of different disabling devices are available for selectively rendering the cylinders of the engine inoperative. Such devices include mechanisms for preventing any of the valves from opening in the disabled cylinders, such that gas remains trapped within the cylinder. Such devices may also include mechanisms for altering the effective stroke of one or more cylinders.

Controller 10 operates electronic throttle operator 20, which may comprise a torque motor, stepper motor or other type of device used for the purpose of positioning electronic throttle 22. An electronic throttle is, as its name implies, wholly apart from any mechanically operated throttle. Electronic throttle operator 20 provides feedback to controller 10 of the position of electronic throttle 22.

Figure 2:
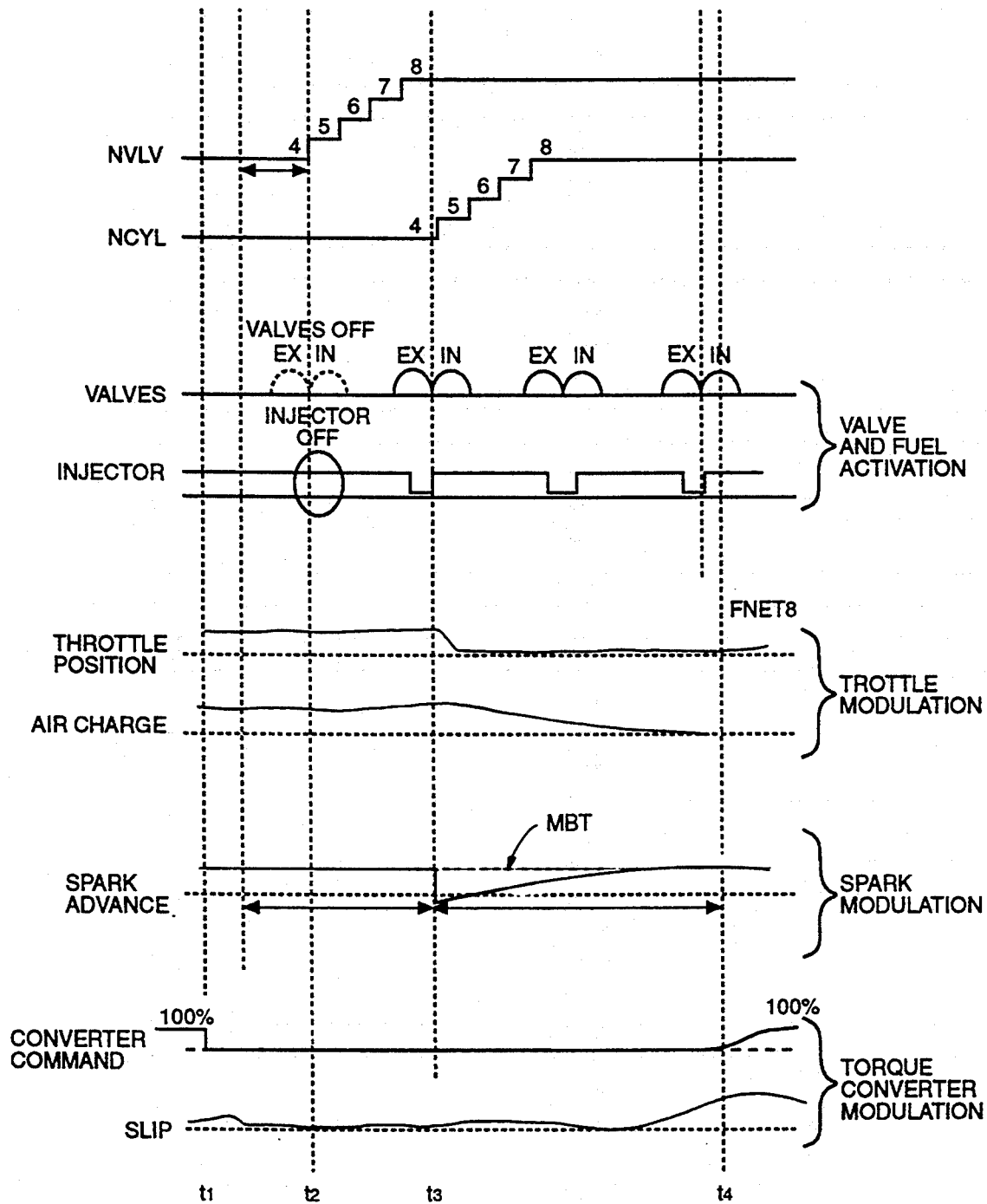
FIG. 2 is a graphical representation of the behavior of several engine control parameters during a transition from operation with four activated cylinders to eight activated cylinders in an eight cylinder engine operated according to the present invention.

FIG. 2 illustrates various engine operating parameters during a transition from fractional operation with, in this case, four activated cylinders, to maximum. operation with eight activated cylinders. The line labeled "NVLV" shows the commands given by processor 10A to activate additional cylinders of the engine. The line labeled "NCYL" shows the actual number of cylinders in operation. The line labeled "VALVES" shows the cycling of the intake and exhaust valves associated with a deactivatable cylinder of the engine. The line labeled "INJECTOR" illustrates fuel injection timing. The line labeled "THROTTLE POSITION" illustrates the position of electronic throttle 22. The line labeled "AIR CHARGE" illustrates the amount of air entering the activated cylinders. The line labeled "SPARK ADVANCE" shows the spark schedule commanded by microprocessor 10A via spark timing controller 14. The line "CONVERTER COMMAND" illustrates a torque reduction command issued to the transmission torque converter. Finally, the line labeled "SLIP" illustrates the relative velocity of the torque converter output turbine with respect to the engine's crankshaft.

At time $t_1$, the command is given for eight cylinder operation. As shown on line NVLV, beginning at time $t_2$, the number of cylinders given a command for activation is stepped from four to eight. The NCYL line shows that the number of activated cylinders begins increasing to eight by time $t_3$. The VALVES line shows that by time $t_3$, the first set of valves being reactivated has begun to operate.

In order to prevent unwanted torque pulses, the engine cylinders are in effect filled and emptied of air by the present system such that torque output in the four and eight cylinder modes is matched. In order to have a smooth transition from four to eight cylinder operation, it is necessary that intake manifold pressure be reduced such that the appropriate pressure exists for eight cylinder operation. Accordingly, at time $t_3$, electronic throttle 22 is closed; the electronic throttle is not opened until time $t_4$, when all eight cylinders are operating at an appropriate air charge, as shown from the AIR CHARGE line. At time $t_3$, the engine is operating at an eight cylinder firing frequency. In general, throttle 22 is maintained in a closed position for an amount of time sufficient to allow the air pressure within the intake manifold to decrease to the pressure at which the engine will have substantially the same torque output with eight cylinder operation as it had with four cylinder operation. In effect, it is necessary to rapidly reduce the air pressure within the intake manifold, because the engine would otherwise be operating in an overcharged condition for the first few cycles of eight cylinder operation, due to the elevated manifold pressure during four cylinder operation. Note here that the throttle is not closed until the engine is operating with an eight cylinder firing frequency. If the throttle were closed while the engine was operating as a four cylinder engine, a large negative torque pulse would result, and this would largely negate the transparent operation which is the object of this invention.

In addition to rapidly closing throttle 22 during transitions from fractional operation to maximum operation, spark timing is controlled as shown in the SPARK ADVANCE line. At time $t_3$, spark timing is retarded from the MBT (minimum timing advance for best torque), while operating in four cylinders, to a position of lesser advance. It has been determined that for a 4.6L eight cylinder engine operating between four and eight cylinders that it is desirable to retard the spark by up to 30 degrees, or more. Operating the engine with retarded spark timing will have the effect of producing less torque, and this torque limitation will assist in rendering the cylinder operating mode transition transparent to the vehicle operator. It is a considerable advantage of the present invention that this transparency allows operation of the engine in fuel-saving modes more frequently, without the drawbacks of former control systems, as noted above.

The SPARK ADVANCE line of FIG. 2 indicates that spark timing is restored to the MBT value once time $t_4$ is reached. This is appropriate because by time $t_4$ the cylinder air charge has stabilized at the desired eight cylinder value. The shape of the spark retard curve is important. Note that at time $t_3$, the spark is retarded in one step from the MBT timing to a very retarded position. Thereafter, the spark timing is ramped up to the final MBT value at time $t_4$. In this manner the spark timing is maintained at values which are appropriate for the air charge in the engine's cylinders, given that the intake manifold pressure is being reduced from time $t_3$ to time $t_4$. It should be noted that the spark timing is not retarded until the engine is operating with an eight cylinder firing frequency, because if the spark timing is retarded while the engine is operating on only four cylinders, an undesirable negative torque pulse would result.

As a further part of the control strategy, the CONVERTER COMMAND line shows that a torque reduction command is issued at time $t_1$. Resulting torque converter slip, as shown in the SLIP line, allows the torque converter to damp torque pulses arising from the engine, so as to further assure smooth transitions between the various cylinder operating modes. Damping occurs because the torque transmitting capacity of the torque converter is reduced. As a result, torque spikes originating at the engine are not as likely to be transmitted to the transmission, and then to the driveshaft and chassis of the vehicle. In the event that the torque converter is already operating at an appropriately reduced torque capacity, processor 10A will not issue a command to torque converter clutch 16 for further torque reduction. After any transition, torque converter clutch 16 may be locked up, so as to promote improved fuel economy.

Figure 3:
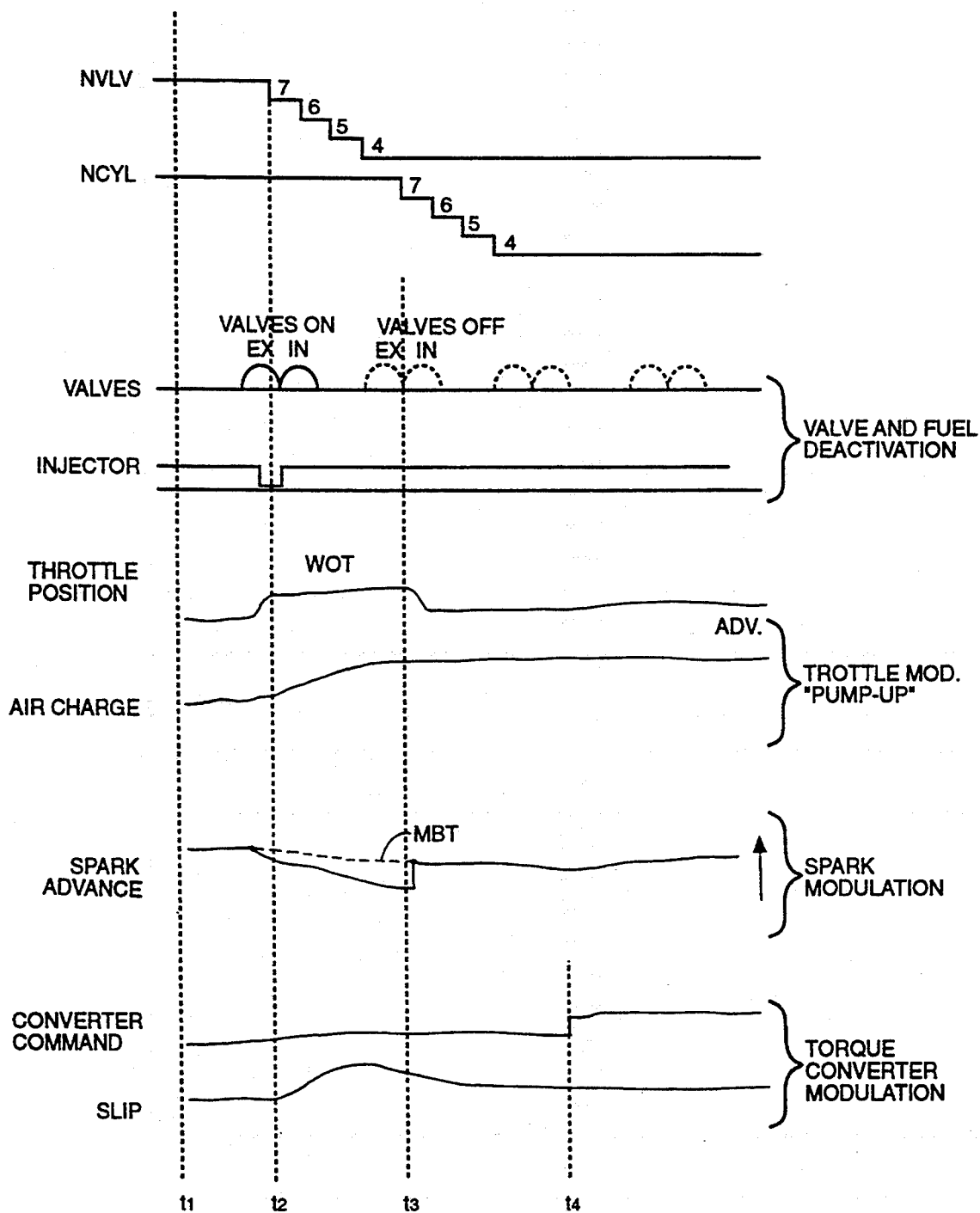
FIG. 3 is a graphical representation of the behavior of the several engine control parameters illustrated in FIG. 2, during a transition from operation with eight activated cylinders to four activated cylinders, with an eight cylinder engine operated according to the present invention.

FIG. 3 illustrates various engine operating parameters during a transition from maximum operation with eight activated cylinders to fractional operation with, in this case, four activated cylinders. Each of the labeled lines describes the behavior of the same variables as in FIG. 2.

At time $t_1$, the command is given for four cylinder operation. As shown on line NVLV, the number of cylinders given a command for activation is stepped from eight to four, beginning at time $t_2$. The NCYL line shows that the number of activated cylinders begins decreasing to four by time $t_3$. The VALVES line shows that by time $t_3$, a first set of valves is deactivated.

As with the four to eight cylinder transition, in order to prevent unwanted torque pulses, the engine cylinders are in effect filled and emptied of air by the present system such that torque output in the four and eight cylinder modes is matched.

In order to have a smooth transition from eight to four cylinder operation, it is necessary that intake manifold pressure be increased such that the appropriate pressure exists when only four cylinders are activated. Accordingly, at time $t_2$, electronic throttle 22 is opened, and it remains open until time $t_3$, when four cylinders are operating at an appropriate air charge, as shown from the AIR CHARGE line. In general, throttle 22 is maintained in a open position for an amount of time sufficient to allow the air pressure within the intake manifold to increase to the pressure at which the engine will have substantially the same torque output with four cylinder operation as it had with eight cylinder operation. In effect, it is necessary to rapidly increase the air pressure within the intake manifold, because the engine would otherwise be operating in an undercharged condition for the first few cycles of four cylinder operation, due to the lower manifold pressure during eight cylinder operation. Those skilled in the art will appreciate in view of this disclosure that it may not be necessary to move electronic throttle 22 to either the fully closed or the wide open throttle positions in order to obtain intake manifold filling and emptying within the time limits described herein, because in certain operating conditions it may be possible to obtain the needed time response without the use of closed throttle or wide open throttle. Accordingly, throttle positions which approximate the closed or wide open positions may be employed with the present system.

In addition to rapidly opening throttle 22 during transitions from maximum operation to minimum operation, spark timing is controlled as shown in the SPARK ADVANCE line. At time $t_2$, processor 10A begins retarding spark timing from the MBT point to a position of less advance. Spark advance is gradually retarded, but only while the engine is operating with eight cylinders. Operating the engine with retarded spark timing will have the effect of producing less torque, and this torque limitation will assist in rendering the cylinder operating mode transition transparent to the vehicle operator. It is a considerable advantage of the present invention that this transparency allows operation of the engine in fuel-saving modes more frequently, without the drawbacks of former control systems, as noted above.

The SPARK ADVANCE line of FIG. 3 indicates that spark timing is restored to the MBT value in a step like manner once time $t_3$ is reached. This is appropriate because by time $t_3$ the cylinder air charge has stabilized at the desired four cylinder value and the engine is in the four cylinder operating mode. In essence, processor 10A tracks the number of cylinders actually in operation, and commands spark controller 14 to retard the spark advance to a point which is less than the minimum advance for best torque, with the spark being retarded by an amount proportional to the degree to which the air charge within the activated cylinders exceeds the desired steady state air charge for the instantaneous number of cylinders operating. This feature is employed with all transitions i.e., transitions to greater or lesser numbers of activated cylinders.

As a further part of the control strategy, the CONVERTER COMMAND line shows that a torque reduction command is issued at time $t_1$. Resulting torque converter slip, as shown in line SLIP allows the torque converter to damp torque pulses arising from the engine, so as to further assure smooth transitions between the various cylinder operating modes.

Changes and modifications may be made to the system described herein without departing from the scope of the invention as set forth in the appended claims. And, a system according to the present invention has wide applicability and could be employed to operate an eight cylinder engine at three, four, five, six, seven, or eight cylinders, or a six cylinder engine at three, four, five or six cylinders.

We claim:

1. A system for controlling the transient torque output of a multicylinder, variable displacement, spark-ignited, fuel injected automotive internal combustion engine during periods when the effective displacement of the engine is being changed, said system comprising:

a spark timing controller;

a throttle controller for positioning an intake air throttle;

an engine cylinder operator means for deactivating and reactivating at least some of said cylinders;

an engine controller having a processor for selecting the number of cylinders for operation and for operating said spark timing controller, said throttle controller, and said cylinder operator means such that during any transition from operation with a first number of activated cylinders to operation with a second number of activated cylinders, the processor will alter the spark advance and control the amount of air entering the engine cylinders so that the torque output of the engine will remain relatively unchanged during such transition.

2. A system according to Claim 1, wherein said processor commands said throttle to approximately its wide-open position during at least part of transitions from a state of operation of a greater number of activated cylinders to a lesser number of activated cylinders, with said processor commanding the throttle to approximately its closed position during at least part of transitions from a state of operation of a lesser number of activated cylinders to a greater number of activated cylinders.

3. A system according to claim 2, wherein said processor commands said spark timing controller to retard the spark advance during said transitions.

4. A system according to claim 2, wherein said processor maintains said throttle in approximately a closed position during transitions from operation at a lesser number of cylinders to operation at a greater number of cylinders for a time sufficient to allow pressure within the intake manifold to rapidly decay to the pressure at which the engine will have substantially the same torque output with the number of cylinders in operation after the transition as it had with a different number of cylinders prior to the transition.

5. A system according to claim 2, wherein said processor maintains said throttle in approximately an open position during transitions from operation at a greater number of cylinders to operation at a lesser number of cylinders for a time sufficient to allow pressure within the intake manifold to increase to the pressure at which the engine will have substantially the same torque output with the number of cylinders in operation after the transition as it had with a different number of cylinders prior to the transition.

6. A system according to claim 2, wherein said engine has eight cylinders and said processor commands the throttle to approximately its closed position for an amount of time approximately equivalent to a predetermined number of crankshaft revolutions when the engine transitions from a state of operation with less than eight cylinders to operation with eight cylinders.

7. A system according to claim 2, wherein said engine has eight cylinders and said processor commands the throttle to its wide open position for an amount of time approximately equivalent to a predetermined number of crankshaft revolutions when the engine transitions from a state of operation with less than eight cylinders to operation with four cylinders.

8. A system according to claim 1, wherein said processor commands said spark timing controller to retard the spark advance whenever the engine changes the number of activated cylinders.

9. A system according to claim 8, wherein said processor commands said spark timing controller to retard the spark advance to a point which is less than the minimum advance for best torque, with the spark being retarded by an amount proportional to the degree to which the air charge within the activated cylinders exceeds the desired steady state air charge for the instantaneous number of cylinders operating.

10. A system according to claim 8, wherein said processor commands said spark timing controller to retard the spark with an initial step decrease in spark advance, followed by gradual advance of the spark timing to a point approximating MBT during transitions from operation with a lesser number of cylinders to operation with a greater number of cylinders.

11. A system according to claim 8, wherein said processor commands said spark timing controller to gradually retard the spark followed by a step advance of the spark timing to a point approximating MBT during transitions from operation with a greater number of cylinders to operation with a lesser number of cylinders.

12. A system according to claim 8, wherein said processor tracks the number of cylinders actually in operation, and commands the spark controller to retard the spark advance to a point which is less than the minimum timing advance for best torque, with the spark being retarded by an amount proportional to the degree to which the air charge within the activated cylinders exceeds the desired steady state air charge for the instantaneous number of cylinders operating.

13. A method for controlling the torque output of a multicylinder, variable displacement, spark-ignited, fuel injected, automotive internal combustion engine during changes in the effective displacement, comprising the steps of:

commanding a cylinder operator to change the number of activated cylinders;

controlling the spark advance so as to temporarily limit the torque capability of the engine during at least part of the transition to operation with the new number of cylinders; and controlling the flow of air into the engine cylinders such that the amount of air admitted into the activated cylinders after the transition corresponds to the torque output of the engine prior to the transition.

14. A method according to claim 13, wherein the spark advance is retarded from the point of minimum advance for best torque with the number of activated cylinders prior to completion of the transition.

15. A method according to claim 14, wherein the spark is retarded by an amount which is proportional to the degree to which the air charge within cylinders which have been activated prior to a transition either exceeds or is less than the air charge within the cylinders which remain activated after the transition.

* * * * *

(12) EX PARTE REEXAMINATION CERTIFICATE (5639th)
United States Patent
Huffmaster et al.

(10) Number: US 5,437,253 C1
(45) Certificate Issued: Dec. 26, 2006

(54) SYSTEM AND METHOD FOR CONTROLLING THE TRANSIENT TORQUE OUTPUT OF A VARIABLE DISPLACEMENT INTERNAL COMBUSTION ENGINE

(75) Inventors: Roger L. Huffmaster, Canton, MI (US); Jerry D. Robichaux, Southgate, MI (US)

(73) Assignee: Ford Global Technologies, LLC, Dearborn, MI (US)

Reexamination Request:
No. 90/007,680, Aug. 19, 2005

Reexamination Certificate for:
Patent No.: 5,437,253
Issued: Aug. 1, 1995
Appl. No.: 08/298,694
Filed: Aug. 31, 1994

Related U.S. Application Data

(62) Division of application No. 08/172,361, filed on Dec. 23, 1993, now Pat. No. 5,374,224.

(51) Int. Cl.
*F02D 11/10* (2006.01)
*F02D 17/02* (2006.01)

(52) U.S. Cl. .................... 123/399; 123/406.23; 123/481
(58) Field of Classification Search ........................ None
See application file for complete search history.

(56) References Cited

U.S. PATENT DOCUMENTS 4,104,991 A * 8/1978 Abdoo ................... 123/198 F
5,040,508 A * 8/1991 Watanabe ................... 123/396
5,099,941 A * 3/1992 Kawano et al. ............. 180/179
5,115,396 A * 5/1992 Keegan ...................... 701/102
5,481,461 A   1/1996 Miyamoto et al.

OTHER PUBLICATIONS

Hatano, Lida, Higashi and Murata, "Development of a New Variable Engine Displacement and Valve Timing System", published Oct. 1992.

* cited by examiner

*Primary Examiner*—Bibhu Mohanty

(57) ABSTRACT

A system for controlling the transient torque output of a multicylinder, variable displacement, spark-ignited, fuel injected automotive internal combustion engine during periods when the effective displacement of the engine is being changed includes a spark timing controller, a throttle controller for positioning an intake air throttle, an engine cylinder operator for deactivating and reactivating at least some of the engine's cylinders, and an engine controller having a processor for selecting the number of cylinders for operation and for operating the spark timing controller, the throttle controller, and the cylinder operator so that during any transition from operation with a first number of activated cylinders to operation with a second number of activated cylinders, the processor will alter the spark advance and control the amount of air entering the engine cylinders so that the torque output of the engine will remain relatively unchanged during the transition.

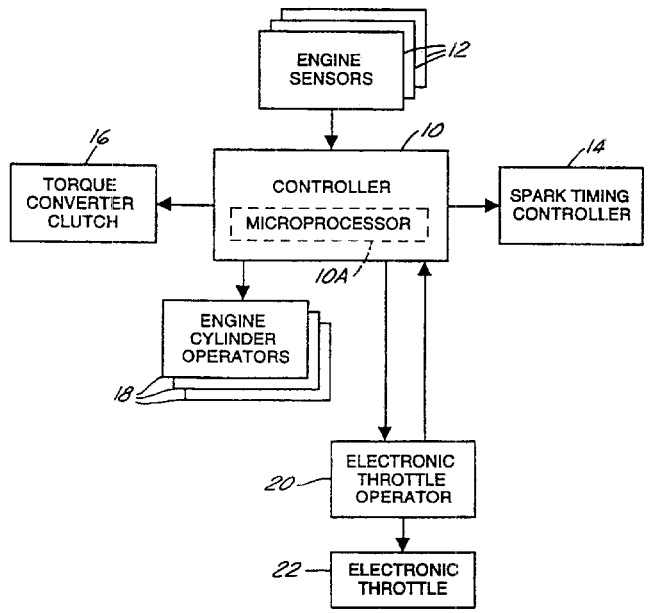

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 2, 4, 5–7 and 13 are determined to be patentable as amended.

Claims 3, 8–12, 14 and 15, dependent on an amended claim, are determined to be patentable.

New claims 16–28 are added and determined to be patentable.

1. A system for controlling the transient torque output of a multicylinder, variable displacement, spark-ignited, fuel injected automotive internal combustion engine during periods when the effective displacement of the engine is being changed, said system comprising:
   a spark timing controller;
   [a] *an electronic* throttle controller for positioning an *electronically controlled* intake air throttle;
   an engine cylinder operator means for deactivating and reactivating at least some of said cylinders;
   an engine controller having a processor for selecting the number of cylinders for operation and for operating said spark timing controller, said *electronic* throttle controller, and said cylinder operator means such that during any transition from operation with a first number of activated cylinders to operation with a second number of activated cylinders, the processor will alter the spark advance and control the amount of air entering the engine cylinders so that the torque output of the engine will remain relatively unchanged during such transition.

2. A system according to Claim 1, wherein said processor commands said *electronically controlled intake air* throttle to approximately its wide-open position during at least part of transitions from a state of operation of a greater number of activated cylinders to a lesser number of activated cylinders, with said processor commanding the *electronically controlled intake air* throttle to approximately its closed position during at least part of transitions from a state of operation of a lesser number of activated cylinders to a greater number of activated cylinders.

4. A system according to claim 2, wherein said processor maintains said *electronically controlled intake air* throttle in approximately a closed position during transitions from operation at a lesser number of cylinders to operation at a greater number of cylinders for a time sufficient to allow pressure within the intake manifold to rapidly decay to the pressure at which the engine will have substantially the same torque output with the number of cylinders in operation after the transition as it had with a different number of cylinders prior to the transition.

5. A system according to claim 2, wherein said processor maintains said *electronically controlled intake air* throttle in approximately an open position during transitions from operation at a greater number of cylinders to operation at a lesser number of cylinders for a time sufficient to allow pressure within the intake manifold to increase to the pressure at which the engine will have substantially the same torque output with the number of cylinders in operation after the transition as it had with a different number of cylinders prior to the transition.

6. A system according to claim 2, wherein said engine has eight cylinders and said processor commands the *electronically controlled intake air* throttle to approximately its closed position for an amount of time approximately equivalent to a predetermined number of crankshaft revolutions when the engine transitions from a state of operation with less than eight cylinders to operation with eight cylinders.

7. A system according to claim 2, wherein said engine has eight cylinders and said processor commands the *electronically controlled intake air* throttle to its wide open position for an amount of time approximately equivalent to a predetermined number of crankshaft revolutions when the engine transitions from a state of operation with less than eight cylinders to operation with four cylinders.

13. A method for controlling the torque output of a multicylinder, variable displacement, spark-ignited, fuel injected, automotive internal combustion engine during changes in the effective displacement, comprising the steps of:
   commanding a cylinder operator to change the number of activated cylinders;
   controlling the spark advance so as to temporarily limit the torque capability of the engine during at least part of the transition to operation with the new number of cylinders; and
   controlling the flow of air into the engine cylinders *at least in part by delivering, to an electronic throttle operator, commands for positioning an electronically controlled intake air throttle* such that the amount of air admitted into the activated cylinders after the transition corresponds to the torque output of the engine prior to the transition.

*16. The system of claim 1, further comprising a cylinder intake valve, a cylinder exhaust valve, and a mechanism for deactivating a cylinder corresponding to the cylinder intake valve and the cylinder exhaust valve by preventing the cylinder intake valve and the cylinder exhaust valve from opening to trap gas within that deactivated cylinder.*

*17. The system of claim 16, wherein during cylinder deactivation, the cylinder exhaust valve deactivates before the cylinder intake valve deactivates, and during cylinder reactivation the cylinder exhaust valve reactivates before the cylinder intake valve reactivates.*

*18. The system of claim 16, wherein the engine controller suspends fuel injection for a deactivated cylinder.*

*19. The system of claim 1, wherein said processor commands said spark timing controller to retard spark advance as a number of activated cylinders changes under at least some engine operating conditions.*

*20. A system for controlling the transient torque output of a multicylinder, variable displacement, spark-ignited, fuel injected automotive internal combustion engine during periods when the effective displacement of the engine is being changed, said system comprising:*
   *a spark timing controller;*
   *an electronic throttle controller for positioning an electronically controlled intake air throttle;*
   *an engine cylinder operator means for deactivating and reactivating at least some of said cylinders, the engine cylinder operator means including:* a cylinder intake valve;
a cylinder exhaust valve, and
a mechanism for deactivating a cylinder corresponding to the cylinder intake valve and the cylinder exhaust valve by preventing the cylinder intake valve and the cylinder exhaust valve from opening to trap gas within that deactivated cylinder; and
an engine controller having a processor for selecting the number of cylinders for operation and for operating said spark timing controller, said electronic throttle controller, and said cylinder operator means such that during any transition from operation with a first number of activated cylinders to operation with a second number of activated cylinders, the processor will alter the spark advance and control the amount of air entering the engine cylinders so that the torque output of the engine will remain relatively unchanged during such transition,
wherein during cylinder deactivation, the cylinder exhaust valve deactivates before the cylinder intake valve deactivates, and during cylinder reactivation the cylinder exhaust valve reactivates before the cylinder intake valve reactivates, wherein a fuel injector corresponding to a cylinder deactivates before the cylinder exhaust valve corresponding to that cylinder deactivates or before the cylinder intake valve corresponding to that cylinder deactivates, and wherein a fuel injector corresponding to a cylinder reactivates after the cylinder exhaust valve corresponding to that cylinder reactivates and before the cylinder intake valve corresponding to that cylinder reactivates.

21. A system for controlling the transient torque output of a multicylinder, variable displacement, spark-ignited, fuel injected automotive internal combustion engine during periods when the effective displacement of the engine is being changed, said system comprising:
a spark timing controller;
an electronic throttle controller for positioning an electronically controlled intake air throttle;
a cylinder intake valve;
a cylinder exhaust valve;
an engine cylinder operator means for deactivating and reactivating at least some of said cylinders, wherein the engine cylinder operator means includes a mechanism for deactivating a cylinder corresponding to the cylinder intake valve and the cylinder exhaust valve by preventing the cylinder intake valve and the cylinder exhaust valve from opening to trap gas within that deactivated cylinder;
a fuel injector, wherein during cylinder deactivation, the fuel injector deactivates before the cylinder exhaust valve deactivates or before the cylinder intake valve deactivates;
an engine controller having a processor for selecting the number of cylinders for operation and for operating said spark timing controller, said electronic throttle controller, and said cylinder operator means such that during any transition from operation with a first number of activated cylinders to operation with a second number of activated cylinders, the processor will alter the spark advance and control the amount of air entering the engine cylinders so that the torque output of the engine will remain relatively unchanged during such transition.

22. A system for controlling the transient torque output of a multicylinder, variable displacement, spark-ignited, fuel injected automotive internal combustion engine during periods when the effective displacement of the engine is being changed, said system comprising:
a spark timing controller;
an electronic throttle controller for positioning an electronically controlled intake air throttle;
a cylinder intake valve;
a cylinder exhaust valve;
an engine cylinder operator means for deactivating and reactivating at least some of said cylinders, wherein the engine cylinder operator means includes a mechanism for deactivating a cylinder corresponding to the cylinder intake valve and the cylinder exhaust valve by preventing the cylinder intake valve and the cylinder exhaust valve from opening to trap gas within that deactivated cylinder;
a fuel injector, wherein during cylinder reactivation, the fuel injector reactivates after the cylinder exhaust valve reactivates;
an engine controller having a processor for selecting the number of cylinders for operation and for operating said spark timing controller, said electronic throttle controller, and said cylinder operator means such that during any transition from operation with a first number of activated cylinders to operation with a second number of activated cylinders, the processor will alter the spark advance and control the amount of air entering the engine cylinders so that the torque output of the engine will remain relatively unchanged during such transition.

23. A system for controlling the transient torque output of a multicylinder, variable displacement, spark-ignited, fuel injected automotive internal combustion engine during periods when the effective displacement of the engine is being changed, said system comprising:
a spark timing controller;
an electronic throttle controller for positioning an electronically controlled intake air throttle;
a cylinder intake valve;
a cylinder exhaust valve;
an engine cylinder operator means for deactivating and reactivating at least some of said cylinders, wherein the engine cylinder operator means includes a mechanism for deactivating a cylinder corresponding to the cylinder intake valve and the cylinder exhaust valve by preventing the cylinder intake valve and the cylinder exhaust valve from opening to trap gas within that deactivated cylinder, and wherein during cylinder deactivation, the cylinder exhaust valve deactivates before the cylinder intake valve deactivates;
an engine controller having a processor for selecting the number of cylinders for operation and for operating said spark timing controller, said electronic throttle controller, and said cylinder operator means such that during any transition from operation with a first number of activated cylinders to operation with a second number of activated cylinders, the processor will alter the spark advance and control the amount of air entering the engine cylinders so that the torque output of the engine will remain relatively unchanged during such transition.

24. The system of claim 23, wherein during cylinder deactivation, a fuel injector corresponding to a cylinder deactivates before the cylinder exhaust valve corresponding to that cylinder deactivates or before the cylinder intake valve corresponding to that cylinder deactivates.

25. A system for controlling the transient torque output of a multicylinder, variable displacement, spark-ignited, fuel injected automotive internal combustion engine during periods when the effective displacement of the engine is being changed, said system comprising:

a spark timing controller;

an electronic throttle controller for positioning an electronically controlled intake air throttle;

a cylinder intake valve;

a cylinder exhaust valve;

an engine cylinder operator means for deactivating and reactivating at least some of said cylinders, wherein the engine cylinder operator means includes a mechanism for deactivating a cylinder corresponding to the cylinder intake valve and the cylinder exhaust valve by preventing the cylinder intake valve and the cylinder exhaust valve from opening to trap gas within that deactivated cylinder, and wherein during cylinder reactivation, the cylinder exhaust valve reactivates before the cylinder intake valve reactivates;

an engine controller having a processor for selecting the number of cylinders for operation and for operating said spark timing controller, said electronic throttle controller, and said cylinder operator means such that during any transition from operation with a first number of activated cylinders to operation with a second number of activated cylinders, the processor will alter the spark advance and control the amount of air entering the engine cylinders so that the torque output of the engine will remain relatively unchanged during such transition.

26. The system of claim 25, wherein during cylinder reactivation, a fuel injector corresponding to a cylinder reactivates after the cylinder exhaust valve corresponding to that cylinder reactivates.

27. The system of claim 25, wherein during cylinder reactivation, a fuel injector corresponding to a cylinder reactivates before the cylinder intake valve corresponding to that cylinder reactivates.

28. The system of claim 25, wherein during cylinder reactivation, a fuel injector corresponding to a cylinder reactivates after the cylinder exhaust valve corresponding to that cylinder reactivates and before the cylinder intake valve corresponding to that cylinder reactivates.

* * * * *